United States Patent Office 2,764,755
Patented Sept. 25, 1956

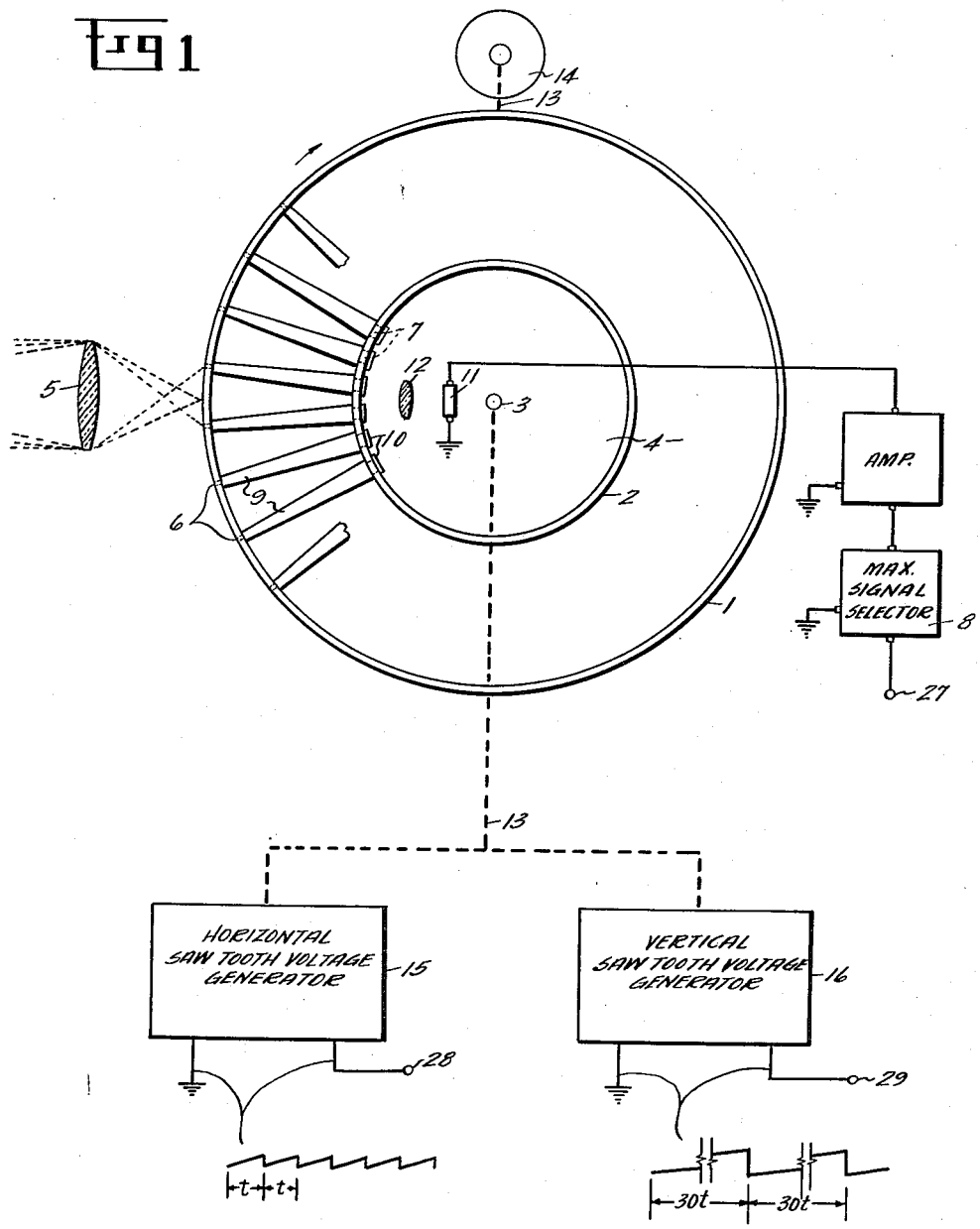

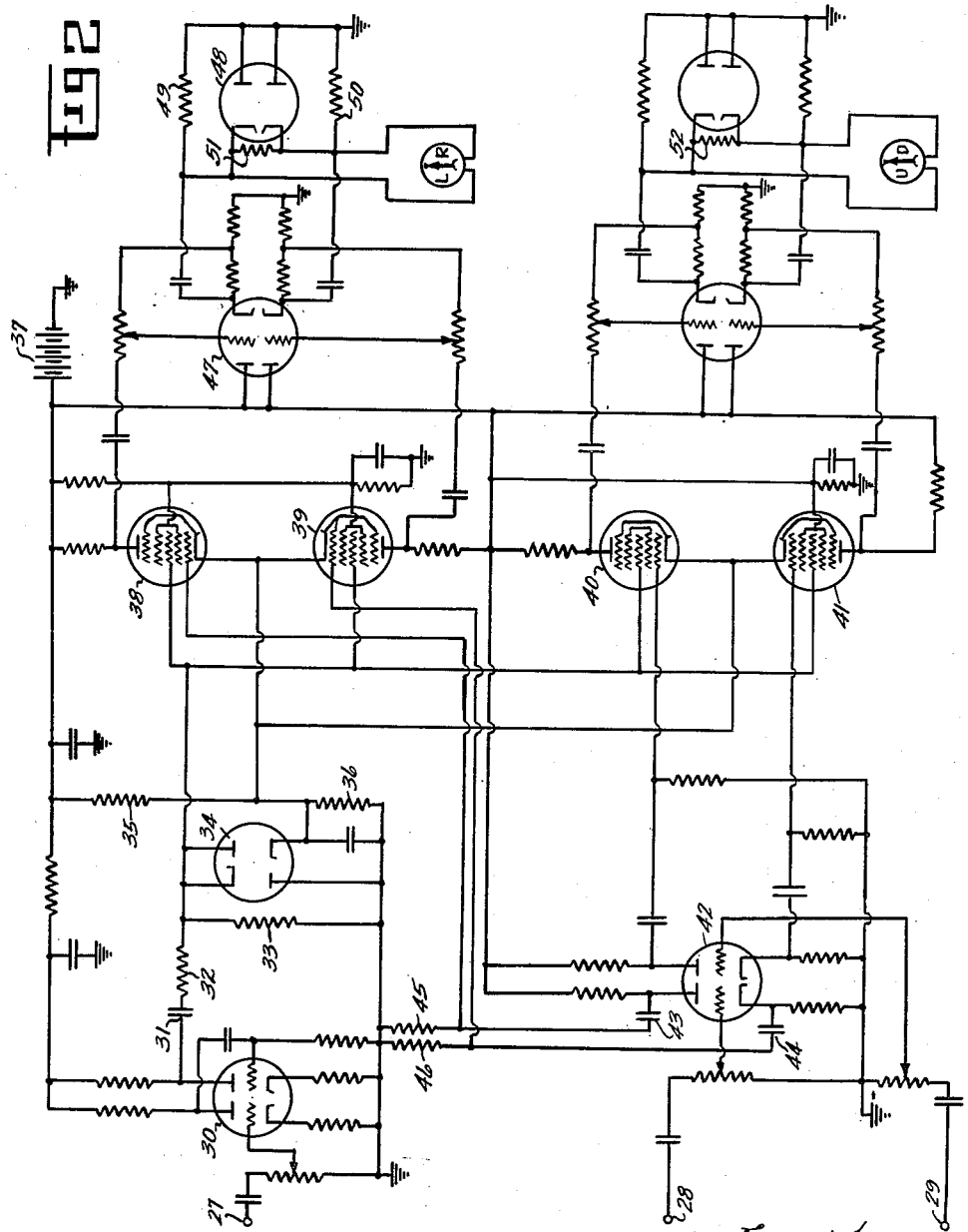

2,764,755

POSITION INDICATOR CIRCUIT

Charles B. Aiken, Wilton, and William J. Sloughter, Ridgefield, Conn., assignors to the United States of America as represented by the Secretary of the Air Force Application April 13, 1950, Serial No. 155,732

2 Claims. (Cl. 343—100)

The invention herein may be manufactured and used by or for the Government for governmental purposes without payment to us of any royalty thereon.

This invention relates to a circuit for indicating the position of a source of radiant energy in a scanned field.

It is the object of the invention to provide a circuit for receiving a signal from a scanning device and for producing voltages therefrom indicative of whether the source of the energy received by the scanner and producing the signal is to the right or left, or above or below, the center of the scan.

The circuit has particular use in guided missiles or homing devices where it is desired to navigate a missile toward a target which emits radiant energy in the form of infrared light or radio waves.

The circuit is designed to operate with a scanner which scans over a rectangular area by means of a succession of parallel lines, for example, along parallel horizontal lines from top to bottom. The scanner should incorporate a maximum signal selector device for passing only the strongest signal obtained in each scanning cycle. For right-left indication, the indicator circuit contains a pair of amplifier tubes each having first and second control grids. A saw-tooth voltage, varying linearly with the horizontal scan from left to right, is generated for each scanning line. The saw-tooth voltage, by means of a phase inverter, is applied in inverted phase relationship to the first control grids of the pair of amplifier tubes so that as the scan moves from left to right the gain of one tube increases from a minimum to a maximum and the gain of the other tube decreases from a maximum to a minimum. The signal from the scanner is first passed through suitable limiters, which hold it to a fixed amplitude, and is then applied in parallel to the second control grids of the two amplifier tubes and the outputs of the two tubes are separately rectified and the two resulting direct voltages compared. If the target is in the center of the scan from left to right, the signal pulse reaching the amplifier grids will arrive at a time when the gains of the two amplifier tubes are equal resulting in two equal direct voltages, whereas, if the target is to the right or left of center, one or the other of the two direct current voltages will predominate. Similarly, by the use of an additional pair of amplifier tubes and a saw-tooth voltage varying linearly with the scan in a vertical direction, two direct voltages are produced which indicate whether the target is above or below the center of the scan.

A specific embodiment of the invention will be described in connection with the accompanying drawings in which:

Fig. 1 shows a suitable scanner and saw-tooth wave generators for use with the indicator circuit; and Fig. 2 is a schematic circuit diagram of a specific embodiment of the indicator circuit in accordance with the invention.

The indicator circuit is intended to operate with a scanning device of the line scanning type. The scanner may be of the type in which the scan is from left to right along successive parallel and adjacent straight lines with a sufficient number of lines being used to cover the desired area. Since the circuit is intended primarily for use in indicating the position of a source of radiant energy, such as visible or infrared radiations, the scanning requirements as to number of lines per frame and frame frequency need not be so stringent as in cases where greater detail must be transmitted such, for example, as in television. Therefore, mechanical scanners, such as shown in Fig. 1, are well suited to the purposes of target indication. Referring to this figure, the scanner comprises a hollow cylinder 1 and an inner concentric hollow cylinder 2 both positioned concentrically about the center 3 on base plate 4. The cylinders 1 and 2 have an axial length somewhat greater than the height of the image of the field to be scanned, which is focused on the external surface of cylinder 1 by lens 5. The cylinder 1 contains a series of small apertures 6, thirty of which are employed in the embodiment shown, spaced at equal intervals along a spiral path extending around cylinder 1 from the top of the image to be scanned to the bottom thereof. With this arrangement one revolution of the cylinder assembly causes these apertures to scan successively along thirty horizontal lines from the top to the bottom of the image. The cylinder 2 contains apertures 7 positioned radially with respect to apertures 6 and somewhat larger than apertures 6. The apertures 7 are all spaced at the same level on cylinder 2 preferably longitudinally midway thereof. The apertures in both cylinders may be of any convenient shape, preferably round.

Slightly divergent optical horns 9 having circular cross sections and tapering from the size of the apertures 6 to the size of the apertures 7, are positioned between each pair of apertures 6—7. These horns may be hollow and made of an opaque material having highly reflective inner surfaces, or from a transparent material having total internal reflection, such as quartz. Light or other radiations from the image being scanned pass through apertures 6 and through horns 9 to apertures 7. When a divergent bundle of rays is injected into the narrow end of a small-angle horn of the above described type, the steeper rays are reflected oftener than those which are more nearly parallel to the horn axis to start with. At each reflection of any ray the angle between the ray and the axis is reduced by an amount equal to twice the angle between the side of the horn and the axis. As the various rays pass down the tube they therefore become more and more nearly parallel to the axis and upon emerging from the far end can be brought to a focus by a lens with only a small circle of confusion. Divergency of the horns is not essential, however, and elements of uniform diameter may be employed if desired.

A prism 10 is positioned behind each aperture 7 and serves to bend the parallel rays emitted therefrom to a direction parallel to base plate 4 so that as the scanner rotates the rays from prisms 10 may be focused on the receiver 11 by lens 12. The scanner assembly is mounted on shaft 13 which is rotated at a constant speed by motor 14. The type receiver used will be governed by the character of the radiations to be detected. For the scanner shown, which is capable of receiving radiations in and above or below the visible spectrum, receiver 11 would be a photoelectric cell, or an ultraviolet sensitive device, and an infrared sensitive device such as a bolometer or lead sulphide cell. The output of the receiver, after amplification, is applied to maximum signal selector 8 which permits only the strongest signal produced in each scanning cycle to pass. The details of the selector 8 form no part of the invention and therefore are not shown.

As already stated, the position indicator circuit requires saw-tooth voltages synchronized with the horizontal and vertical scanning action of the scanner. These voltages may be generated and synchronized with the scanner in any suitable manner and the specific design of the means for accomplishing this does not form a part of the invention. Accordingly the horizontal saw-tooth voltage generator and the vertical saw-tooth voltage generator are shown as blocks 15 and 16, respectively, in Fig. 1. The shaft 13 is extended to generators 15 and 16 to indicate that the operation of these elements is synchronized with the rotation of scanning cylinder 1. The horizontal saw-tooth voltage generator 15 operates to produce a linear saw-tooth voltage each time an aperture 6 moves across the scanned image, the time required for which is indicated as $t$ in Fig. 1. The vertical saw-tooth voltage generator 16 operates to generate one linear saw-tooth voltage for each revolution of the scanner, starting when the first aperture 6 begins its sweep across the scanned image and terminating when the last aperture 6 has completed its sweep across the image. For 30 scanning apertures, as in the embodiment illustrated, the time length of one vertical saw-tooth voltage would be $30t$ as shown.

Fig. 2 shows a schematic diagram of the position indicator circuit in accordance with the invention. The maximum signal produced by the scanner is applied through terminal 27 to a two stage resistance coupled amplifier comprising the two triode sections of tube 30. Connected across the output of the right-hand section of this tube, through blocking condenser 31, is a potential divider made up of resistors 32 and 33. The left-hand diode section of tube 34 is connected in shunt to resistor 33 and is poled so that substantially no negative voltage can be developed across this resistor. The right-hand diode section of tube 34 is also connected in shunt to resistor 33, however, the cathode of this diode is given a positive bias by means of potential divider 35—36 connected across voltage supply source 37. Whenever the positive voltage across resistor 33 exceeds the voltage drop across resistor 36 the right-hand diode conducts and prevents a further rise in voltage across resistor 33. The signal across this resistor is therefore always positive and substantially equal in amplitude to the drop across resistor 36. The signal across resistor 33 is applied to the third grid in each of tubes 38, 39, 40 and 41. The diodes of tube 34 act as amplitude limiters and, in the presence of normal signal amplitudes, cause the signal which is delivered to the tubes 38, 39, 40 and 41 to be always of the same amplitude.

The horizontal saw-tooth voltage from generator 15 (Fig. 1) is applied through terminal 28 to the grid of the left-hand triode section of tube 42. The saw-tooth voltage appearing at the anode of this section is inverted with respect to the signal appearing on the cathode and these two voltages are applied to the first grids of tubes 38 and 39, respectively, by means of coupling condensers 43 and 44 and grid resistors 45 and 46. With this arrangement, as an aperture 6 (Fig. 1) moves from left to right across the image along a horizontal line, the voltage on the first grid of tube 38 varies linearly from a maximum to a minimum, and the voltage on the first grid of tube 39 varies linearly from a minimum to a maximum. The first and third grids of tubes 38 and 39 are biased negatively with respect to the cathodes by the voltage drop across resistor 36.

The function of the saw-tooth voltages applied to the first grids of tubes 38 and 39 is to control the amplification of these tubes with respect to the signal applied to the third grids. Therefore, since the applied signal is always of the same amplitude the resulting signal in the output circuit of these tubes depends upon the potential of the first grids at the instant the signal from the scanner is applied to the third grids. If the signal is applied at the center of the scan, as would be the case when the target is horizontally centered in the scanned field, the voltages on the first grids of tubes 38 and 39 would be equal and therefore the resulting signals in the output circuits of these tubes would be equal. If the target were to the left of center, then when the signal from the scanner is applied to tubes 38 and 39, the potential in the first grid of tube 38 would be greater than the potential on the first grid of tube 39 and, therefore, the amplification of tube 38 would exceed that of tube 39 and the resulting output signal of tube 38 would be greater. Similarly if the target were to the right of center, the output signal of tube 39 would exceed that of tube 38 due to the greater voltage on the first grid of this tube during this half of the scan. The difference in first grid potentials and therefore the amplification and output signals of the two tubes is approximately proportional to the displacement of the target from the center of the scan.

The output signal of tube 38 is applied to a cathode follower stage comprising the upper triode section of tube 47 the output of which is rectified by the upper diode section of tube 48, resulting in a positive direct potential across resistor 49. Similarly, the output signal of tube 39 is applied to a cathode follower stage comprising the lower triode section of tube 47 the output of which is rectified by the lower diode section of tube 48, resulting in a positive direct potential being developed across resistor 50. The difference in these two positive potentials appears across resistor 51. When the target is in the center of the scan, the two rectified potentials are equal and the potential across resistor 51 is zero. When the target is to the right or left of center a potential appears across resistor 51 the value of which is approximately proportional to the displacement of the target from center and the polarity of which is indicative of whether the displacement is to the right or left.

A direct voltage indicative of the amount and direction of the up-down displacement of the target from the center of the scan is developed across resistor 52 in exactly the same manner as described above for the right-left voltage developed across resistor 51. The vertical saw-tooth voltage from generator 16 (Fig. 1) is applied through terminal 29 to the phase inverter comprising the right-hand triode section of tube 42. The saw-tooth voltage on the anode of this section is applied to the first grid of tube 40 and that on the cathode to the first grid of tube 41, which are identical in construction and operation to tubes 38 and 39.

Galvanometer type meters are shown connected across resistors 51 and 52 to give right-left and up-down indications. Other type indicators could also be used. The crossed-hand type used in blind landing systems for aircraft and the cathode-ray tube type are examples. In a cathode-ray type indicator the voltage across resistor 51 would be applied to the horizontal beam deflecting circuit and that across resistor 52 to the vertical beam deflecting circuit. Vertical and horizontal cross-hairs could be used on the screen for reference. The voltages developed across resistors 51 and 52 could also be used with a suitable control circuit and servo system to steer a craft, missile or homing bomb, etc. toward a target emitting radiations which could be detected by the scanning system.

The position indicator circuit is not limited to use with mechanical scanners of the type shown in Fig. 1. A cathode-ray scanner having a mosaic sensitive to the radiations emitted by the target could be used equally well. In this case the saw-tooth voltages used for horizontal and vertical deflection of the beam could also be used in the position indicator circuit, making the generators 15 and 16 of Fig. 1 unnecessary.

What we claim is:

1. A position indicator circuit for use with a line scanning device of the type generating a single output signal in each scanning cycle representing the predominant object in the scanned field, said circuit comprising a horizontal saw-tooth voltage generator for generating a saw-tooth voltage varying from a minimum to a maximum value during the scanning of one line by said scanner, a vertical saw-tooth voltage generator for generating a saw-tooth voltage varying from a minimum to a maximum value during the movement of said scanner between the limits of its travel in a direction at right angles to said scanning lines, a pair of variable gain amplifier tubes, means for controlling the gain of one of said pair of tubes in accordance with said horizontal saw-tooth voltage, means for inverting said horizontal saw-tooth voltage and for controlling the gain of the other of said pair of tubes in accordance with said inverted horizontal saw-tooth voltage, means for limiting the output signal of said scanner to a signal of constant amplitude and for applying said limited signals to the input circuits of said pair of tubes in parallel, means for rectifying the output signal of each of said pair of tubes, and means for producing a voltage equal to the difference in the rectified outputs of said pair of tubes, a second pair of variable gain amplifier tubes, means for controlling the gain of one of said second pair of tubes in accordance with said vertical saw-tooth voltage, means for inverting said vertical saw-tooth voltage and for controlling the gain of the other of said second pair of tubes in accordance with said inverted vertical saw-tooth voltage, means for applying said limited signals from said scanner to the input circuits of said second pair of tubes in parallel, means for rectifying the output signal of each of said second pair of tubes, and means for producing a voltage equal to the difference in the rectified outputs of said second pair of tubes.

2. A position indicator comprising a line scanning device, said scanner producing an electrical impulse each time a detectable object is encountered in a scanning line, means for selecting the maximum electrical impulse produced by said scanner during each scanning line, means synchronized with said scanner for producing a saw-tooth voltage varying from a minimum to a maximum value as the scanner proceeds from the start to the finish of a scanning line, a pair of variable gain amplifier tubes, means for controlling the amplification of one of said tubes in accordance with said saw-tooth voltage, means for inverting said saw-tooth voltage and for controlling the amplification of the other of said tubes in accordance with said inverted saw-tooth voltage, means for limiting said selected maximum electrical impulses to a constant amplitude, means for applying said constant amplitude impulses by said scanner to the input circuits of said amplifier tubes in parallel, means for rectifying the output signal of each of said tubes, and means for producing a voltage equal to the difference between the rectified outputs of said tubes.

References Cited in the file of this patent

UNITED STATES PATENTS 2,482,544     Jacobsen  ---------------  Sept. 20, 1949